UNITED STATES PATENT OFFICE.

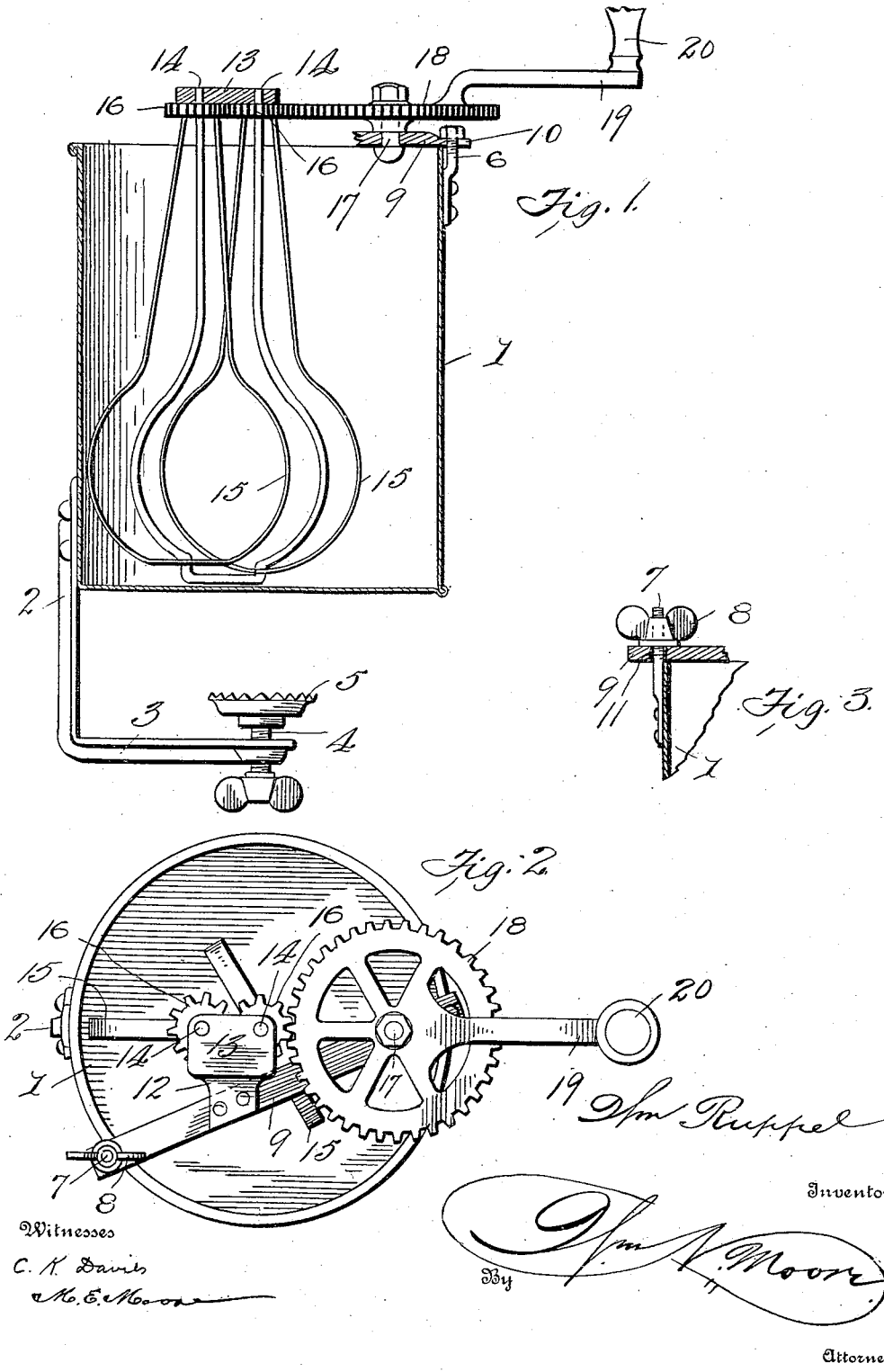

WILLIAM RUPPEL, OF EVANSTON, WYOMING.

EGG-BEATER.

No. 869,736.  Specification of Letters Patent.  Patented Oct. 29, 1907.

Application filed April 24, 1907. Serial No. 369,947.

*To all whom it may concern:*

Be it known that I, WILLIAM RUPPEL, a citizen of the United States, residing at Evanston, in the county of Uinta and State of Wyoming, have invented certain new and useful Improvements in Egg-Beaters, of which the following is a specification.

My invention relates to improvements in egg beaters, and has for its object, the provision of a combined receptacle and mixer of simple and durable construction, the parts of which may be readily disassembled for cleaning, and which shall be practical and efficient in every respect for all purposes intended.

With these and other objects in view, my invention comprises a receptacle having a clamp for securing it in any desired position, a support removably mounted on the receptacle, and an egg beater or whisk carried by the support.

The invention further consists of an egg beater embodying certain other novel features of construction, combination and arrangement of parts substantially as disclosed herein and as illustrated in the accompanying drawings, in which:

Figure 1, is a vertical sectional view through the device showing the manner in which the receptacle is clamped in place. Fig. 2, is a top plan view of my invention. Fig. 3, is a detail view showing the manner in which the supporting bar is secured in position.

In the drawings: the numeral 1, designates the receptacle or can which may be of any size and is preferably cylindrical in shape. A clamp bar 2, is secured to the receptacle which is provided with a lateral or horizontal portion 3, adapted to extend beneath the table or other support upon which the receptacle is resting. A clamp screw 4, mounted in the end of the clamp bar, carries the swiveled washer 5, on its upper end adapted for engagement with the lower face of the table or support, so that by the aforesaid means, the receptacle is securely clamped in position.

An upstanding headed stud 6, is affixed to the upper edge of the receptacle, and at a diagonally opposite point is affixed a corresponding threaded post 7, having a wing nut 8, mounted thereon. The supporting bar 9, is formed with a slot 10, in one end for engagement with the headed stud and at the opposite end is provided with an opening 11, to pass over the screw post, so that the supporting bar is thus removably mounted on the upstanding posts and held in position by means of the wing nut. An upstanding angular bracket 12, is secured upon the supporting bar, the bracket having a laterally offset portion 13, in which are secured the ends of the looped supporting wire or rod 14. Whisks or beaters 15, are pivotally engaged on the guard wire 14, said beaters carrying on their upper ends, the intermeshing pinions 16. A post 17, is mounted near one end of the supporting bar, and upon said post is journaled the comparatively large spur gear 18, which meshes with the closest one of the pinions and serves to rotate the same. A crank handle 19, is secured to the large driving gear and is offset therefrom, it being provided on the end with a handle 20.

From the foregoing description taken in connection with the drawings, the operation and advantages of my invention will be readily understood and appreciated, it being evident that I have provided a practical egg beater which accomplishes all the objects herein set forth.

I claim:

An egg beater comprising a receptacle, a clamp bar depending from the receptacle, a clamp screw in the end of said bar, a stud mounted on the rim of the receptacle provided with a nut on its upper end forming a head, a corresponding threaded post mounted on the rim opposite said post, a supporting bar having one end slotted for engagement with the headed stud and the opposite end formed with an opening to pass over the threaded post, a wing nut on the post to clamp the bar in position, an angular bracket on the supporting bar having an offset portion, a looped support depending from and having its ends engaged in the angular bracket, pinions journaled on the upper ends of the support, beaters depending from said pinions, and a spur gear journaled on the supporting bar meshing with the pinions and provided with an operating handle.

In testimony whereof I affix my signature in presence of two witnesses.

WILLIAM RUPPEL.

Witnesses:
 J. B. MCNEIL,
 G. B. GOEN.